(12) United States Patent
Ding

(10) Patent No.: US 10,408,401 B2
(45) Date of Patent: Sep. 10, 2019

(54) INTELLIGENT ELECTRONIC CANDLE

(71) Applicant: Nantong Yatai Wax Artware Co., Ltd., Nantong, Jiangsu (CN)

(72) Inventor: Yingqi Ding, Jiangsu (CN)

(73) Assignee: Nantong Yatai Wax Artware Co., Ltd., Nantong, Jiangsu (CN)

( * ) Notice: Subject to any disclaimer, the term of this patent is extended or adjusted under 35 U.S.C. 154(b) by 0 days.

(21) Appl. No.: 15/523,447

(22) PCT Filed: Jan. 7, 2016

(86) PCT No.: PCT/CN2016/070356
§ 371 (c)(1),
(2) Date: May 1, 2017

(87) PCT Pub. No.: WO2017/113435
PCT Pub. Date: Jul. 6, 2017

(65) Prior Publication Data
US 2018/0080617 A1 Mar. 22, 2018

(30) Foreign Application Priority Data
Dec. 31, 2015 (CN) .......................... 2015 1 1012846

(51) Int. Cl.
*F21S 10/00* (2006.01)
*F21S 6/00* (2006.01)
(Continued)

(52) U.S. Cl.
CPC .............. *F21S 10/002* (2013.01); *F21S 6/001* (2013.01); *F21S 10/046* (2013.01);
(Continued)

(58) Field of Classification Search
CPC ......... F04B 19/04; F21S 10/002; F21S 10/04; F21S 10/046; F21S 6/001; F21V 23/004; F21V 23/0442; F21V 31/005; F21Y 2115/30; H05B 37/02; H05B 37/0236; Y02B 20/42; Y02B 20/48
See application file for complete search history.

(56) References Cited

U.S. PATENT DOCUMENTS 5,737,168 A * 4/1998 Baker .................... H02H 3/207
361/84
6,921,023 B1 * 7/2005 Bright .................. A01K 63/006
239/17
(Continued)

*Primary Examiner* — Tsion Tumebo
(74) *Attorney, Agent, or Firm* — Rankin, Hill & Clark LLP

(57) ABSTRACT

An intelligent electronic candle, includes a cylindrical and hollow casing. Inside the casing, a circulation pump, a header tank are provided. The circulating water pump is arranged below the header tank, where a number of overflow ports are available on the top thereof. The outlet tube of the pump is connected above the circulating pump, and an outlet port is set up on the top of the pump outlet tube. The outlet is connecting with the header tank. An LED lamp is set up at the outer side of the pump outlet tube including a power supply with a charging port. The LED lamp is electrically connected with a power supply by wiring. A control circuit board is provided inside the casing at the bottom. The control circuit board is provided with a microprocessor, time module, radio communication module and voice control switch.

5 Claims, 2 Drawing Sheets

(51) Int. Cl.
  *F21S 10/04* (2006.01)
  *F21V 23/04* (2006.01)
  *F04B 19/04* (2006.01)
  *F21V 23/00* (2015.01)
  *F21Y 115/10* (2016.01)
  *F21V 31/00* (2006.01)
  *H05B 33/08* (2006.01)
  *F21Y 115/30* (2016.01)
  *H05B 37/02* (2006.01)

(52) U.S. Cl.
  CPC ........ F21V 23/0442 (2013.01); F21V 31/005 (2013.01); H05B 33/0863 (2013.01); *F04B 19/04* (2013.01); *F21V 23/004* (2013.01); *F21Y 2115/10* (2016.08); *F21Y 2115/30* (2016.08); *H05B 37/0236* (2013.01)

(56) References Cited

U.S. PATENT DOCUMENTS

| | | | |
|---|---|---|---|
| 8,763,926 B2* | 7/2014 | Powell | B05B 17/00 239/16 |
| 9,080,762 B2* | 7/2015 | Ray | F21V 33/00 |
| 9,625,112 B2* | 4/2017 | Li | F21S 10/04 |
| 2003/0161145 A1* | 8/2003 | Liu | F21S 6/001 362/161 |
| 2005/0129546 A1* | 6/2005 | Lin | B05B 17/08 417/527 |
| 2005/0169666 A1* | 8/2005 | Porchia | A01M 1/02 399/111 |
| 2005/0174473 A1* | 8/2005 | Morgan | H05B 33/0803 348/370 |
| 2007/0081423 A1* | 4/2007 | Chien | F21S 8/035 368/67 |
| 2008/0319556 A1* | 12/2008 | Perry | H05B 37/0227 700/14 |
| 2013/0258648 A1* | 10/2013 | Ding | F21S 6/001 362/190 |
| 2015/0124442 A1* | 5/2015 | Ding | F21S 6/001 362/231 |
| 2015/0124474 A1* | 5/2015 | Ding | F21S 6/001 362/554 |
| 2015/0276204 A1* | 10/2015 | Ray | F21S 6/001 239/20 |
| 2016/0298815 A1* | 10/2016 | Lai | F21S 10/002 |

* cited by examiner

INTELLIGENT ELECTRONIC CANDLE

TECHNICAL FIELD

This invention relates to alighting device, particularly an intelligent electronic candle.

BACKGROUND

With the improvement of people's living standard, people are aspiring more and more for mental needs when they are satisfactory with the material needs. The great variety of dainty electric appliances gradually come into the people's daily life. The electronic candle is one of them. The electronic candle innovates the traditional burning candle to replace it with an LED lamp, however, the candle's romantic characteristics are reserved while safety is insured without heating and flame to avoid causing a fire accident. The electronic candle also has beautiful features, applicable to all kinds of candle holders, and useful for night lighting as well as for other decorations.

Traditional candles are usually made of wax, which is used to illuminate or render the atmosphere by lighting candles. Traditionally, when the candle is burned, the wax oil and smoke produced therefrom can cause pollution to the environment. Moreover, the traditional candle is not quite stable, easy to fall by wind blows or careless touches, and even to cause a fire accident; therefore, some electronic candle have appeared in the market gradually to replace the traditional candle simulating the candle lights. However, the existing electronic candles in the market are simple and monotonous in design, and the installation process is complex with low level of intelligence and low efficiency for assembling thus short of market competitiveness.

BRIEF DESCRIPTION

In order to solve the above problem, the subject disclosure provides a technical solution featured with simple structure, convenient use, environmental protection, safety and aesthetics and low cost. The solution is able to realize the technical functions of voice control, remote control and time switching on the LED lamp.

According to one aspect, an intelligent electronic candle includes a casing which is of a cylindrical hollow structure, furnished with a circulating pump and header tank. The circulating pump is arranged below the header tank, and the side wall of the header tank is provided with a silicon sealing coating, and an opening is arranged at the bottom of the header tank. A rubber seal plug is clipped at the opening. On the rubber seal plug, a number of holes are available for wiring passage. On the top of the header tank, an overflow tube is connected, which is furnished with a number of overflow holes. Above the circulating pump, an outlet tube is connected, where an outlet port is set up at the top. The pump outlet port is connected with the header tank. At the outer side of the pump outlet tube, an LED lamp is provided. The pump outlet port is connected to a dummy flame head by a fitting, also including power supply, which is provided with a charging port. And the LED lamp is connected with the power supply by the power supply cord, which goes through the wiring hole on the rubber seal plug. At the lower part of the casing, there is arranged a control circuit board, where a micro-processor a, time module, a radio communication module, and a voice control switch are provided. The radio communication module is connected to the intelligent terminal.

As an optimal selection, the voice control switch can include a rectification filtering circuit, a voice control circuit and a trigger delay circuit.

The rectification filtering circuit consists of diode A, diode B, diode C and diode D to make up rectifying circuit, zener diode, capacitor A, and the positive output end of the rectification circuit includes two branches after the resistor A, one of which is connected with the negative current after the zener diode and capacitor connected in parallel.

The voice control circuit can include a carbon crystal microphone, resistor B, NOT gate A and NAND gate B; the carbon crystal microphone and NOT gate A after being connected in series are connected between one of NAND B and negative output end of the rectification circuit, while the resistor B is connected between the output and input ends of NOT gate A. The positive output of the rectification circuit is connected with an input of the NAND gate B after the resistor A on the other branch, while the other input of NAND B is connected with the negative output end of the rectification circuit.

As an optimal selection, the outlet of the water pump can be arranged on the inner side of a number of overflow ports, and the diameter of the overflow port can be 0.8 cm-1 cm.

This beneficial effect is as follows:

(1) The candle has the advantages of simple structure, convenient use, environmental protection, safety, beautiful appearance and low cost.

(2) the candle can achieve various modes of power charging, and the charging port is connected with the external power source, which Includes switching power, inverted power, AC voltage stabilized power, UPS power, power supply, linear power and voltage regulation power, which are capable of providing continuous charging for the power supply.

(3) a high intelligence is utilized to realize the function of voice control, remote control and timing switch for LED lamp.

DETAILED DESCRIPTION

Figure 1:
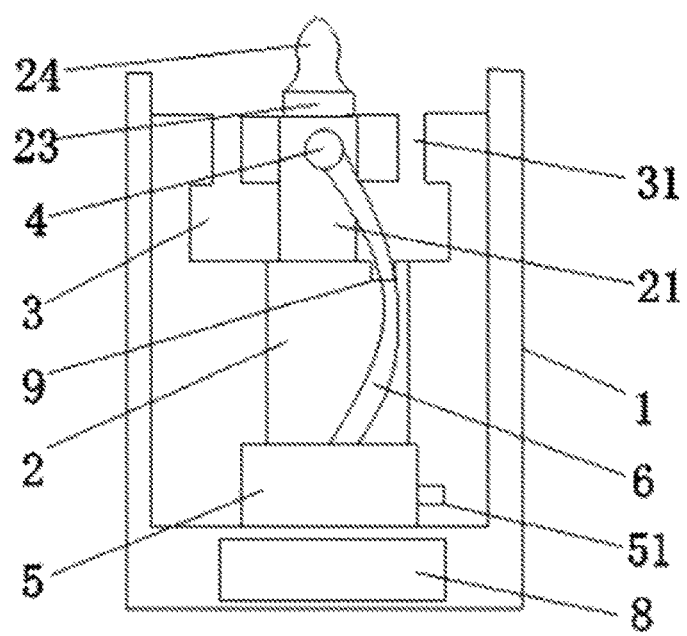
FIG. 1 is a section drawing of a candle according to an exemplary embodiment.
Figure 2:
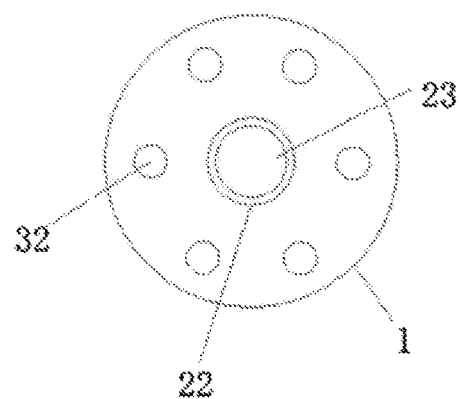
FIG. 2 is a plan drawing of the candle.
Figure 3:
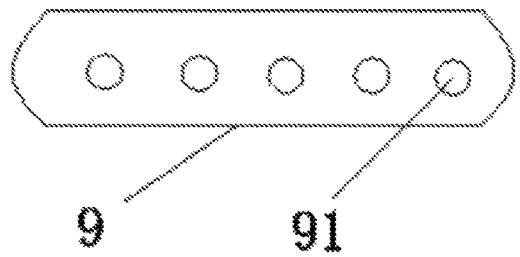
FIG. 3 is a sketch a of rubber sealing plug structure of the candle.
Figure 4:
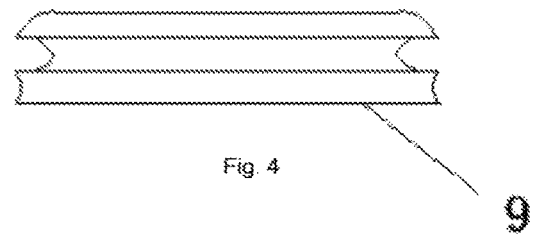
FIG. 4 is a side view of the rubber sealing plug.
Figure 5:
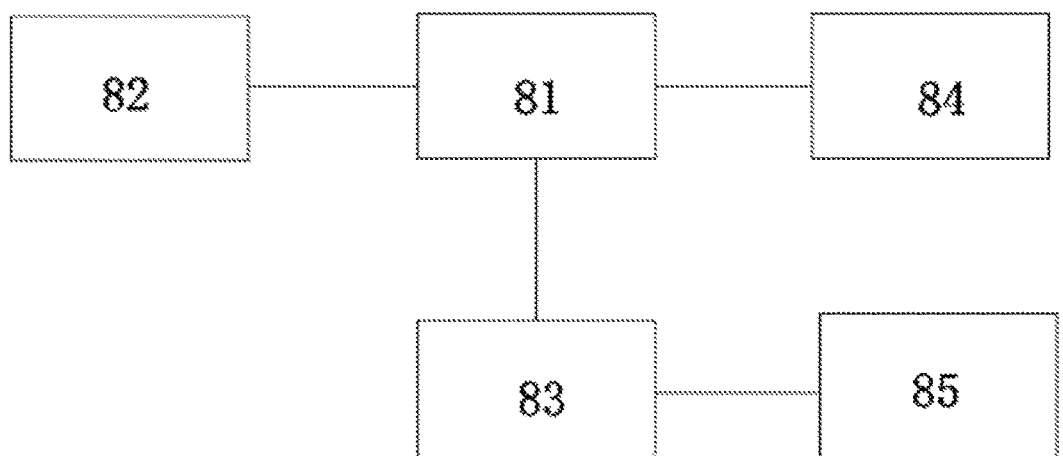
FIG. 5 is a principle diagram of the control circuit board of the candle.

As shown in FIGS. 1 through 5, this intelligent electronic candle includes an outer casing 1, which is of cylindrical and hollow structure. Inside the casing 1, a circulating water pump 2 and a header tank 3 are provided. The circulating pump 2 is arranged below the header tank 3, and the side wall of the header tank 3 is provided with a silicon sealing coating, and an opening is arranged at the bottom of the header tank 3. A rubber seal plug 9 is clipped at the opening. On the rubber seal plug 9, a number of wiring holes 91 are available for wiring to pass therethrough (e.g., form a wiring passage). On the top of the header tank 3, an overflow tube 31 is connected, which is furnished with a number of overflow holes 32. Above the circulating pump 2, an outlet tube 21 of the water pump 2 is connected, where outlet port 22 is set up at the top. The pump outlet port 22 is arranged at the inner side of the overflow port 32 and the diameter of the overflow port is 0.8 cm-1 cm. The outlet of the pump 22 is connected with the header tank 3. At the outer side of the pump outlet tube 21, an LED lamp 4 is provided. The pump outlet port 22 is connected to a dummy flame head 24 by a fitting 23, and the dummy flame head 24 is made of acrylic material, being aesthetic. When it operates, the water is circulating by the pump 2, and the LED lamp is lighting on the circulating water to emit scattered lights showing aesthetic effect. The water from the pump outlet port 22 drives the wire-made fitting 23 to produce the shakes, therefore, the dummy flame 24 is made shaken, then the candle flame is vividly "burning" to realize the flame simulation effect. The candle also includes power supply 5, which is provided with a charging port 51. The LED lamp 4 is connected with the power supply 5 by the power supply cord 6, which goes through the wiring hole 91 on the rubber seal plug 9. The rubber seal plug also plays the role of preventing leakage from the header tank. In addition, the power supply 5 may achieve multi-charging, and the charging port of the power supply is connected to the external power source, which includes switch power, inverted power, AC stabilized power, UPS power, dynamic power, linear power, voltage regulation power, to ensure the continuous supply of power to the power supply 5. At the lower part of the casing, there is arranged a control circuit board 8, where a micro-processor 81, time module 82, radio communication module 83, and the radio communication module are available and the microprocessor is connected respectively with time module 82, radio communication module 83, and the radio communication module 83. The radio communication module 83 is connected with intelligent terminals 85, which include mobile phone, pad computer. The users may send signal for light switching to the microprocessor 81 through the mobile phone or pad computer, then the LED lamp 4 shall be lit up, which is simple and easy for operation. In addition, inside the header tank, a silicon sealing coating is furnished to prevent the leakage from the header tank 3 to protect the power supply from short-circuiting when the power supply is dampened.

Figure 6:
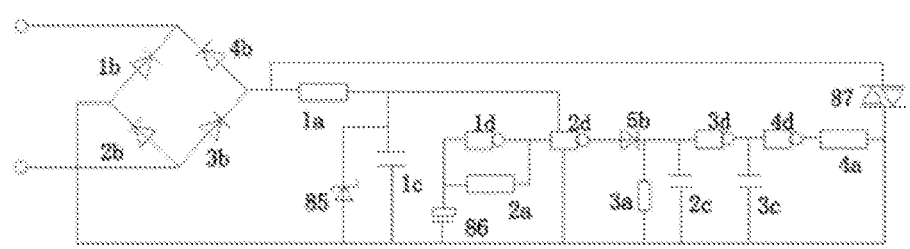
FIG. 6 is a principle diagram of the voice control switch of the candle.

As shown in FIG. 6, the voice control switch 84 comprises rectification circuit, voice control circuit and trigger delay circuit. The rectification filtering circuit includes the rectification circuit, zener diode 85, capacitor A 1c made up of diode A1b diode B 2b, diode C 3b and diode D 4b, and the positive output end of the rectification circuit is branched off into two after the resistor A 1a, wherein, one of which is connected with the negative current of the rectification circuit after the connection of zener diode 85 and capacitor A1c in parallel.

The voice control circuit comprises a carbon crystal microphone 86, resistor B 2a, NOT gate A (1d) and NAND gate B (2d); carbon crystal microphone 86 and NOT gate A1d, after being connected in series, are connected between one input end of NAND B 2d and negative output end of the rectification circuit, while the resistor B 2a is connected between the output and input ends of NOT gate A 1d. The positive output of the rectification circuit is connected with an input of the NAND gate B (2d) after the resistor A (1a) on the other branch, while the other input of NAND B (2d) is connected with the negative output end of the rectification circuit.

Trigger and time delay control circuit comprise NOT gate C 3d, NOT gate D 4d, diode E 5b, resistor C 3a, resistor D 4a and capacitor B 2c, capacitor C 3c. And the output end of NAND gate B 2d is connected sequentially through the diode E 5b NOT gate C 3D d, NOT gate D 4d, resistor D 4a to the gate of bidirectional thyristor 87; the resistor C 3a in parallel connection with capacitor B 2c are connected between the input end of NOT C 3d and negative output end of the rectification circuit. Capacitor C 3c is connected between the input end of NOT gate D 4d and negative output end of the rectification circuit. If the carbon crystal microphone 86 detects the enough voice signal, which then is transformed to the electric signal and the NOT gate A 1d receives this signal and outputs the low level, and NAND gate B 2d outputs the amplified audio signal to make the bidirectional thyristor conductive to provide power to LED lamp 4.

The candle has the beneficial effect as simple structure and principle, convenience for use, and advantages of environmental protection, safety, aesthetics and low cost.

The candle can achieve a various modes of power charging, and the power supply charging port is connected with the external power including switching power, inverted power, AC voltage stabilized power, UPS power, dynamic power, linear power, voltage regulation power and is capable of providing continuous power to charge the power supply; its level of intelligence is very high, and is able to realize voice control, remote control and time switching on the LED lamp.

The above practical examples are only relatively optimal, but not the limits of this invention's technical scheme. Any technical practice based on the above examples without creative efforts shall fall into the protection scope of this invention patent.

The invention claimed is:

1. An intelligent electronic candle, comprising: an outer casing which is of cylindrical and hollow structure, a circulating water pump inside the casing and a header tank, said circulating water pump is arranged at the lower part of the header tank, and the inside wall of the header tank is provided with a silicon sealing coating, and an opening is arranged at the bottom of the header tank and a rubber seal plug is clipped at the opening, wherein, on said rubber seal plug, a number of wiring holes are available for wiring to pass therethrough and, on the top of the header tank an overflow tube separate from and disposed within the outer casing is connected, and the overflow tube defines a number of overflow holes, wherein above said circulating pump, a pump outlet tube is connected, where a pump outlet port is set up at the top of the outlet tube, and wherein the pump outlet port is connected with said header tank and, at the outer side of the pump outlet tube a LED lamp is provided, and wherein said pump outlet port is connected to a dummy flame head by a fitting, including a power supply, which is provided with a charging port and the LED lamp is connected with the power supply by a power supply cord, which goes through one of the wiring holes on the rubber seal plug, and at the lower part of the outer casing, there is arranged a control circuit board, where a micro-processor, time module, radio communication module, voice control switch are provided with said processor connected respectively with the time module, the radio module, the voice module and said radio communication module is connected to an intelligent terminal, wherein water from the pump outlet port drives the fitting to shake the dummy flame to create an enhanced flame simulation effect.

2. An intelligent electronic candle, as described in claim 1 wherein: said voice control switch comprises rectifier filter circuit, voice control circuit and trigger delay circuit, wherein the rectification filter circuit comprises diode A, diode B, diode C and diode D to make up a rectification circuit, zener diode, capacitor A, wherein the positive current of the rectification circuit is branched off into two after the resistor A, one of which is connected with the negative current of the rectification circuit after the zener diode and capacitor being connected in parallel, The voice control circuit comprises a carbon crystal microphone, resistor B, NOT gate A and NAND gate B; carbon crystal microphone and NOT gate A after being connected in series are connected between one of NAND B and negative output end of the rectification circuit, while the resistor B is connected between the output and input ends of NOT gate A, the positive output of the rectification circuit is connected with an input of the NAND gate B after the resistor A on the other branch, while the other input of NAND B is connected with the negative output end of the rectification circuit.

3. An intelligent electronic candle, as described in claim 1 wherein: said pump outlet is arranged at the inside of the overflow ports and the diameter of the overflow port is 0.8 cm-1 cm.

4. An intelligent electronic candle, as described in claim 1 wherein: said dummy flame head is made of acrylic material.

5. An intelligent electronic candle, as described in claim 2 wherein: the trigger and time delay control circuit comprises NOT gate C, NOT gate D, diode E, resistor C, resistor D and capacitor B, capacitor C, and the output end of NAND gate B is connected sequentially through the diode E, NOT gate C, NOT gate D, and resistor D to the gate of bidirectional thyristor; the resistor C and capacitor B, in parallel connection, are connected between the input end of NOT gate C and the negative output end of the rectification circuit; capacitor C is connected between the input end of NOT gate D and the negative output end of the rectification circuit; and if the carbon crystal microphone detects a sufficient voice signal, the signal is transformed to an electric signal and the NOT gate A receives this signal and outputs the signal at a low level, and NAND gate B outputs an amplified audio signal to make the bidirectional thyristor conductive to provide power to the LED lamp.

* * * * *